(12) United States Patent
Ito et al.

(10) Patent No.: US 8,257,130 B2
(45) Date of Patent: Sep. 4, 2012

(54) MANUFACTURING METHOD OF HERMETIC CONTAINER

(75) Inventors: Nobuhiro Ito, Yamato (JP); Mamo Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/070,527

(22) Filed: Mar. 24, 2011

(65) Prior Publication Data

US 2011/0237150 A1    Sep. 29, 2011

(30) Foreign Application Priority Data

Mar. 29, 2010    (JP) .................................. 2010-075066

(51) Int. Cl.
*H01J 9/00* (2006.01)

(52) U.S. Cl. ...... 445/25; 445/24; 156/275.3; 156/379.6; 156/360; 156/286; 156/273.3

(58) Field of Classification Search .................... 445/24, 445/25; 156/286, 272.2, 291, 273.3, 275.3, 156/379.6, 360
See application file for complete search history.

(56) References Cited

U.S. PATENT DOCUMENTS

| | | | |
|---|---|---|---|
| 5,426,631 A | 6/1995 | Miyazaki et al. | |
| 5,693,111 A | 12/1997 | Kadowaki et al. | |
| 5,722,031 A | 2/1998 | Fujii et al. | |
| 6,109,994 A * | 8/2000 | Cho et al. | 445/25 |
| 6,113,450 A | 9/2000 | Narayanan et al. | |
| 6,517,399 B1 | 2/2003 | Ito et al. | |
| 6,817,917 B1 * | 11/2004 | Kado et al. | 445/25 |
| 6,926,571 B2 | 8/2005 | Ito et al. | |
| 7,039,303 B2 | 5/2006 | Kimura et al. | |
| 7,110,665 B2 | 9/2006 | Kamata et al. | |
| 7,383,875 B2 | 6/2008 | Yoshimura et al. | |
| 7,815,760 B2 | 10/2010 | Kimura et al. | |
| 7,847,474 B2 * | 12/2010 | Seon | 313/495 |
| 7,914,357 B2 | 3/2011 | Koyanagi et al. | |
| 7,928,645 B2 | 4/2011 | Suzuki et al. | |
| 2005/0151151 A1 | 7/2005 | Hawtof et al. | |
| 2005/0199599 A1 | 9/2005 | Li et al. | |
| 2006/0082298 A1 | 4/2006 | Becken et al. | |
| 2006/0084348 A1 | 4/2006 | Becken et al. | |
| 2006/0244363 A1 * | 11/2006 | Seon et al. | 313/495 |
| 2007/0200476 A1 | 8/2007 | Kijima et al. | |
| 2008/0110561 A1 * | 5/2008 | Lee et al. | 156/275.3 |
| 2009/0066215 A1 * | 3/2009 | Kweon | 445/24 |

(Continued)

FOREIGN PATENT DOCUMENTS

JP    08-022767 A    1/1996

(Continued)

*Primary Examiner* — Mariceli Santiago
(74) *Attorney, Agent, or Firm* — Fitzpatrick, Cella, Harper & Scinto (57) ABSTRACT

A manufacturing method of a high-reliability hermetic container includes an assembling step of arranging, between first and second glass substrates, a sealing material including first and second straight line portions stretching in different directions and a coupling portion connecting these straight line portions, with a viscosity of the sealing material having a negative temperature coefficient, and a scanning sealing step of performing scanning to the first straight line portion and the coupling portion while irradiating local heating light at least once. Scanning to the second straight line portion and the coupling portion is performed while irradiating the local heating light at least once, and the assembling step further forms at least a part of the sealing material at the coupling portion with a film thickness thinner than the sealing material in a region adjacent to the coupling portion of the first straight line portion.

9 Claims, 7 Drawing Sheets

U.S. PATENT DOCUMENTS

| | | |
|---|---|---|
| 2009/0120915 A1 | 5/2009 | Tagawa et al. |
| 2010/0186350 A1 | 7/2010 | Nakazawa et al. |
| 2010/0190408 A1 | 7/2010 | Kamiguchi et al. |
| 2010/0190409 A1 | 7/2010 | Kamiguchi et al. |

FOREIGN PATENT DOCUMENTS

| | | |
|---|---|---|
| JP | 08-250021 A | 9/1996 |
| JP | 09-208270 A | 8/1997 |
| JP | 2002-137939 A | 5/2002 |
| JP | 2002-515392 T | 5/2002 |
| JP | 2007-234334 A | 9/2007 |
| JP | 2008-059781 A | 3/2008 |
| JP | 2009-070687 A | 4/2009 |
| JP | 2009-104841 A | 5/2009 |
| JP | 2009-196859 A | 9/2009 |

\* cited by examiner

MANUFACTURING METHOD OF HERMETIC CONTAINER

BACKGROUND OF THE INVENTION

1. Field of the Invention

The present invention relates to a manufacturing method of a hermetic container and, more particularly, to a manufacturing method of a hermetic container for an image display apparatus having electron-emitting devices in each of which an inside is held in a vacuum state and a phosphor film.

2. Description of the Related Art

Image display apparatuses of a flat panel type such as an organic LED display (OLED), a field emission display (FED), a plasma display panel (PDP), and the like are well known. Each of those image display apparatuses is equipped with a container which is manufactured by airtightly sealing glass substrates facing each other and of which an internal space is partitioned to an external space. To manufacture such a hermetic container, a spacing distance defining member, a local adhesive, and the like are arranged between the facing glass substrates as necessary, a sealing material is arranged in a frame shape to peripheral portions of the glass substrates, and a heat sealing process is executed. As a heating method of the sealing material, a method whereby the whole glass substrates are baked by a furnace and a method whereby a periphery of the sealing material is selectively heated by local heating have been known. The local heating is more advantageous than the whole heating from viewpoints of a time which is required to heat and cool, an energy which is required to heat, productivity, a prevention of thermal deformation of the hermetic container, a prevention of thermal deterioration of a function device arranged in the hermetic container, and the like. Particularly, a unit using a laser beam has been known as a unit for performing the local heating. Further, it has been known that such a manufacturing method of the hermetic container by using the local heating can be also applied as a manufacturing method of a vacuum insulated glazing glass which does not have a function device therein.

United States Patent Application Publication No. US2005/0151151 discloses a method of manufacturing an container of an OLED. In this method, a circumferential glass frit having a corner portion is first formed by using a first glass substrate as a supporting plate, and the formed glass frit is flattened by weighting or controlling of application thickness by a dispenser. Then, the first glass substrate on which the flattened glass frit has been formed and a second glass substrate are disposed to face each other through the glass frit sandwiched therebetween, and the disposed substrates are assembled. Here, since local heating light is irradiated through scanning, a circumferential sealing material is melted, and thus the first glass substrate and the second substrate are airtightly adhered to each other.

Also, United States Patent Application Publication No. US2006/0082298 discloses a method of manufacturing a container of an OLED. In this method, a circumferential glass frit having a corner portion is first formed by using a first glass substrate as a supporting plate. Then, the first glass substrate on which the glass frit has been formed and a second glass substrate are disposed to face each other through the glass frit sandwiched therebetween, and the disposed substrates are assembled. In such assembling, the first glass substrate and the second glass substrate are externally pressurized by means of a mechanical unit, whereby adherence in a sealing material region can be assured.

As just described, in order to assure the adherence between the sealing material and the glass substrate in the case where the laser beam is irradiated, a sealing method in which an assembling method has been variously improved, instead of a method of simply irradiating a laser beam to a glass substrate being a material to be sealed and the sealing material, has been known.

However, there is a case where airtightness deteriorates due to a defective junction occurring at a coupling portion (corner portion) of the sealing material. That is, in general, the sealing material is provided so that plural straight line portions and coupling portions for connecting those straight line portions are formed on the glass substrate. In case of scanning the sealing material like this while irradiating the laser beam, generally, the scanning by the laser beam is performed for each of the straight line portions, and such an operation is repeated by the number of times corresponding to the number of the straight line portions. In case of adopting such a sealing method, the scanning is performed twice at about the same time to the coupling portion. The sealing material is softened and the thickness thereof decreases if the laser beam is irradiated to the sealing material, and the sealing material is hardened as it is immediately after the end of the irradiation of the laser beam. Further, when the laser beam is irradiated along the straight line, the glass substrate deforms toward the sealing material according to the decrease in the thickness of the sealing material, whereby a spacing distance between the glass substrates decreases.

When the laser beam reaches the region adjacent to the coupling portion, the thickness of the sealing material in the relevant region likewise decreases. However, since the laser beam is not yet irradiated to the coupling portion, the coupling portion still having the large thickness is connected to the plural straight line portions. For this reason, since the glass substrate in the coupling portion is sealed or held by these straight line portions, the glass substrate does not easily deform toward the sealing material. As a result, in the region of the straight line portion adjacent to the coupling portion, since inconsistency occurs between the thickness of the sealing material and the spacing distance between the glass substrates, a defective junction thus occurs. The defective junction causes a decrease in joining strength and a decrease in airtightness.

The present invention is directed to the hermetic container manufacturing method which includes a step of providing the sealing material between the glass substrates, and a step of sealing the glass substrates with each other by scanning the sealing material while irradiating the local heating light thereto. Here, the present invention aims to provide a manufacturing method of a high-reliability hermetic container which assures both joining strength and airtightness.

SUMMARY OF THE INVENTION

A manufacturing method of a hermetic container according to the present invention is directed to a manufacturing method which includes a step of sealing a first glass substrate and a second glass substrate forming at least a part of the hermetic container together with the first glass substrate to each other. The present invention includes an assembling step of arranging, between the first glass substrate and the second glass substrate, a sealing material which includes a first straight line portion and a second straight line portion respectively stretching in different directions and a coupling portion connecting the first straight line portion and the second straight line portion to each other, and of which viscosity has a negative temperature coefficient, and a scanning sealing step of performing scanning to the first straight line portion and the coupling portion of the sealing material while irradiating local heating light at least once, and thereafter performing scanning to the second straight line portion and the coupling portion of the sealing material while irradiating the local heating light at least once. Here, the assembling step includes a step of forming at least a part of the sealing material at the coupling portion with a film thickness thinner than that of the sealing material in a region adjacent to the coupling portion of the first straight line portion.

Further, a manufacturing method of a hermetic container according to the present invention is directed to a manufacturing method which includes a step of sealing a first glass substrate and a second glass substrate forming at least a part of the hermetic container together with the first glass substrate to each other. The present invention includes an assembling step of arranging, between the first glass substrate and the second glass substrate, a sealing material which includes a first straight line portion and a second straight line portion respectively stretching in different directions and a coupling portion connecting the first straight line portion and the second straight line portion to each other, and of which viscosity has a negative temperature coefficient, and a scanning sealing step of performing scanning to the first straight line portion and the coupling portion of the sealing material while irradiating local heating light at least once, and thereafter performing scanning to the second straight line portion and the coupling portion of the sealing material while irradiating the local heating light at least once. Here, the assembling step includes a step of forming at least a part of the sealing material at the coupling portion with a density lower than that of the sealing material in a region adjacent to the coupling portion of the first straight line portion.

When the scanning is performed to the first straight line portion and the coupling portion of the sealing material while irradiating the local heating light at least once, the sealing material is softened, and the film thickness decreases. However, in the assembling step, the coupling portion is formed to have the film thickness thinner than that of or to have the density lower than that of the region adjacent to the coupling portion of the first straight line portion. For this reason, as compared with a case where the coupling portion is formed with the film thickness or the film density approximately the same as that of the region adjacent to the coupling portion of the first straight line portion, the spacing distance between the first and second glass substrates at the coupling portion can be shortened. Consequently, the above-described inconsistency and the defective junction due to the relevant inconsistency are less-likely to occur, whereby both joining strength and airtightness can be achieved.

As just described, according to the present invention, it is possible to provide the manufacturing method of the hermetic container, which achieves both the joining strength and the airtightness and has high reliability.

Further features of the present invention will become apparent from the following description of exemplary embodiments with reference to the attached drawings.

DESCRIPTION OF THE EMBODIMENTS

Hereinafter, exemplary embodiments of the present invention will be described. A manufacturing method of a hermetic container in the present invention can be applied to a manufacturing method of a container to be used for an FED, an OLED, a PDP or the like having a device of which an internal space is required to be airtightly cut off from an external atmosphere. Especially, in an image display apparatus such as the FED or the like of which the inside is set as an evacuated space, joining strength which can withstand an atmospheric pressure load generated due to the negative pressure of the internal space is required. Here, according to the manufacturing method of the hermetic container of the present invention, both securement of joining strength and airtightness can be highly achieved. However, the manufacturing method of the hermetic container according to the present invention is not limited to the above-described manufacturing method of the hermetic container but can be widely applied to a manufacturing method of a hermetic container having sealing portions, which are required to have airtightness, on peripheral portions of glass substrates facing each other. For example, the hermetic container may be formed by vacuum insulated glazing glass.

Figure 7:
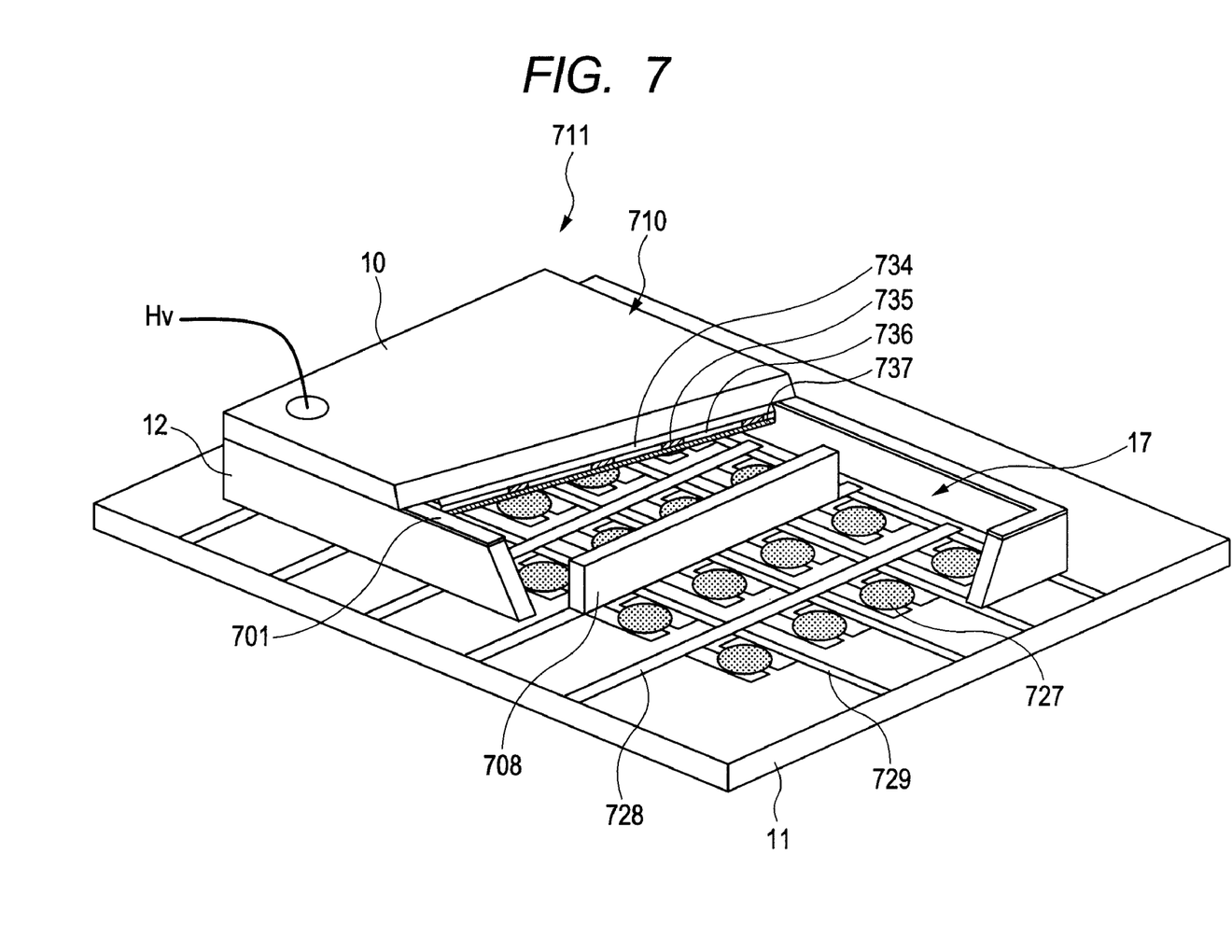
FIG. 7 is a partial cut-away perspective view illustrating a construction of an FED to which the present invention is applicable.

FIG. 7 is a partial cut-away perspective view illustrating an example of an image display apparatus to be targeted to the present invention. A container (hermetic container) 710 of an image display apparatus 711 has a face plate 10, a rear plate 11 and a frame member 12, which are respectively made of glass. The frame member 12, which is positioned between the face plate 10 and the rear plate 11 having plate shapes respectively, forms an internal space 17 sealed between the face plate 10 and the rear plate 11. More specifically, the face plate 10 and the frame member 12 and the rear plate 11 and the frame member 12 are respectively sealed with each other by planes which face each other, thereby forming the container 710 having a sealed internal space. The internal space of the container 710 is maintained to be in a vacuum state, and spacers 708 serving as the spacing distance defining member set between the face plate 10 and the rear plate 11 are located at a predetermined pitch. The face plate 10 and the frame member 12 or the rear plate 11 and the frame member 12 may be previously sealed with each other or may be integrally formed.

A large number of electron-emitting devices 727 for emitting electrons in accordance with an image signal are provided on the rear plate 11, and matrix wirings for driving (X-directional wirings 728 and Y-directional wirings 729) for operating each of the electron-emitting devices 727 in accordance with the image signal are formed. A phosphor film 734 composed of phosphor for emitting light and displaying an image upon receiving the irradiation of electrons emitted from the electron-emitting devices 727 is provided on the face plate 10 positioned opposite to the rear plate 11. A black stripe 735 is further provided on the face plate 10. The phosphor films 734 and the black stripes 735 are provided with a state that those are alternately arranged. A metal back 736 composed of a thin Al film is formed on the phosphor film 734. The metal back 736, which has a function of serving as an electrode for attracting electrons, receives the potential supplied from a high-voltage terminal Hv provided in the container 710. A non-evaporable getter 737 composed of a thin Ti film is formed on the metal back 736.

Since it is sufficient that the face plate 10, the rear plate 11 and the frame member 12 are transparent and have translucency, soda lime glass, high strain point glass, non-alkaline glass or the like can be used. It is desirable that these glass members have excellent wavelength translucency in a used wavelength of local heating light and an absorption wavelength region of a sealing material to be described later.

Next, a sealing method of a glass substrate in the hermetic container manufacturing method of the present invention will be described. The hermetic container manufacturing method of the present invention generally includes a process of sealing a first glass substrate with a second glass substrate, which forms at least a part of the hermetic container together with the first glass substrate.

(Step 1: Assembling Process)

Hereinafter, a process in the step 1 will be described by giving specific examples with reference to FIGS. 1A and 1B and FIGS. 2A to 2D. FIGS. 1A to 1E, which indicate respective process steps, include two drawings respectively, and plan views observing the whole of the circumferential sealing material are indicated on the right side, and cross sectional views respectively observed from the directions A-A in the plan views are indicated on the left side.

This process includes such a step, where a sealing material, which includes a first straight line portion and a second straight line portion respectively stretching in different directions and a coupling portion of connecting the first straight line portion with the second straight line portion, is arranged between the first glass substrate and the second glass substrate. In an example to be described below, the first glass substrate is the plate glass substrate (rear plate 11) and the second glass substrate is the frame glass substrate (frame member 12). A sealing material 13, of which shape is almost a rectangle stretching along the second glass substrate, has four straight line portions including the first and second straight line portions and four coupling portions of connecting these four straight line portions. That is, the coupling portions are four corner portions of the frame sealing material 13.

At first, the frame member 12 which is a frame glass substrate is prepared, and then the face plate 10, which previously has the phosphor (not illustrated), the black stripes and the metal back, is prepared. A glass frit 701 indicated in FIG. 7 is formed on a surface, where phosphor patterns are formed, of the prepared face plate 10 by the printing and baking processes. The formed glass frit 701 and the frame member 12 are contacted with each other and temporarily assembled by using a pressurizing tool (not illustrated), and then integrated by airtight sealing in an atmospheric firing furnace.

Figure 1A:
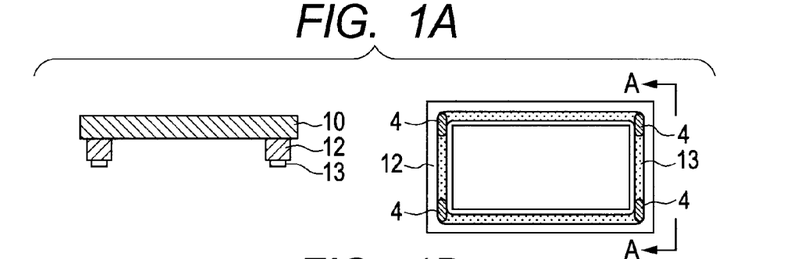
FIGS. 1A, 1B, 1C, 1D and 1E are cross sectional views and plan views illustrating an example of a hermetic container manufacturing method according to the present invention.

Next, the sealing material 13 composed of the glass frit is formed on the frame member 12 by the printing and baking processes. According to this procedure, an assembly formed from the frame member 12, which has the sealing material 13 formed on its edge face, and the face plate 10 is obtained as illustrated in FIG. 1A. The sealing material 13 is located with a state of circling along a circumference of the frame member 12, which is the second glass substrate, as illustrated in FIG. 1A. As a result, the sealing material 13 becomes to have the four straight line portions and the coupling portions (corner portions) of connecting these four straight line portions.

It is desirable that the sealing material 13, of which viscosity has a negative temperature coefficient, is softened at a high temperature. In order to suppress the thermal damage to a glass substrate, it is desirable that a softening point of the sealing material 13 is lower than that of any of the face plate 10, the rear plate 11 and the frame member 12. As an example of the sealing material 13, a glass frit, an inorganic adhesive, an organic adhesive or the like can be enumerated. It is preferable that the sealing material 13 indicates the high absorbability for a wavelength of the local heating light. In case of applying the sealing material to an FED or the like which is required to maintain a degree of vacuum in its internal space, a glass frit or an inorganic adhesive capable of suppressing the decomposition of a residual hydrocarbon is preferably used as the sealing material 13. It is also possible that a frit sheet or the like is arranged between the frame member 12 and the rear plate 11 instead of print-forming the sealing material 13 on the frame member 12.

Incidentally, judging from a purpose of not blocking the irradiation of a laser beam to the sealing material 13, it is preferable to select the material having transparency to a laser beam 15 to be described later as the face plate 10, the frame member 12 and a sealing material 701 for sealing the face plate 10 with the frame member 12. From a viewpoint of suppressing the residual stress to be applied to a hermetic container, it is preferable to select the material, of which a linear expansion coefficient is the same as that of the frame member 12 and the face plate 10 as the rear plate 11.

Hereinafter, a combination of the one coupling portion 3 and the two straight line portions 1 and 2 to be connected by this coupling portion 3 will be described. A case of a combination of another coupling portion and the two straight line portions to be connected by this another coupling portion is also similar to the above-described case. For the sake of simplicity, the straight line portion, which first receives the irradiation of a laser beam, is called a first straight line portion 1, and the straight line portion, which later receives the irradiation of a laser beam, is called a second straight line portion 2.

Figure 2A:
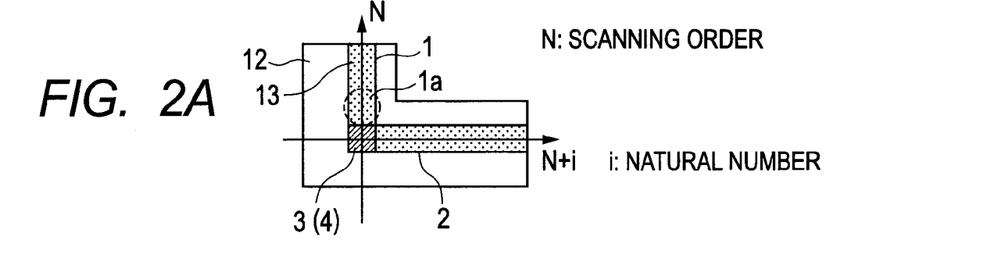
FIGS. 2A, 2B, 2C and 2D are partial enlarged plan views illustrating film thickness distributions of a sealing material in the vicinity of a coupling portion.

FIGS. 2A, 2B, 2C and 2D are partial enlarged views of the sealing material of which shape is almost a rectangle. FIG. 2A is a partial enlarged plan view in the vicinity of a coupling portion of the sealing material 13 formed on the frame member 12. In the present embodiment, the coupling portion (corner portion) 3 is formed to have such a thickness thinner than that of a region 1a adjacent to the coupling portion 3 of the first straight line portion 1. This region having the thinner film thickness is called a low film-thickness region 4. The low film-thickness region 4 is provided on only the coupling portion 3. In the present embodiment, although the coupling portion 3 coincides with the low film-thickness region 4, the low film-thickness region 4 may be provided on only a part of the coupling portion 3. That is, the low film-thickness region 4 is allowed to be provided on at least a part of the coupling portion 3. It is preferable that a film thickness of the low film-thickness region 4 is decreased for a film thickness of the region 1a within a range of 5% to 40%. Since a film thickness of the first straight line portion 1 is generally constant without depending on its portions, a film thickness of the region 1a usually coincides with a film thickness of a general portion (central portion or the like) of the first straight line portion 1.

Figure 2B:
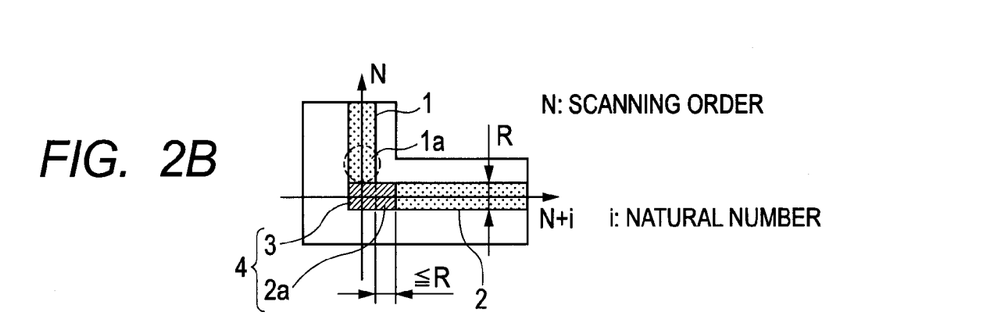
Figure 2C:
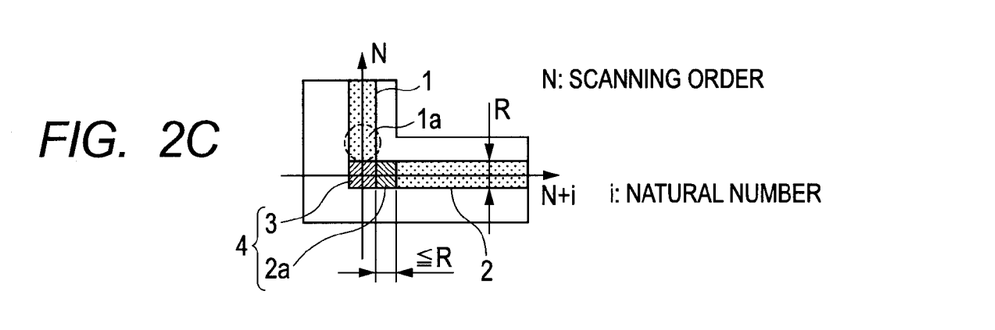
Figure 2D:
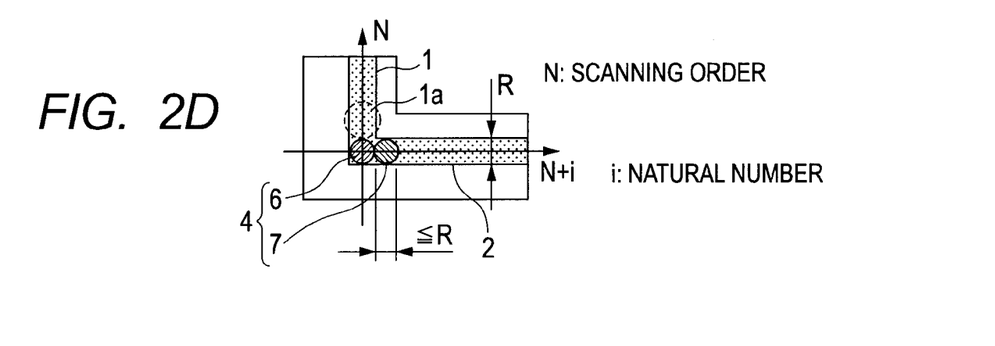

As illustrated in FIGS. 2B to 2D, the low film-thickness region 4 can be provided on a region 2a adjacent to the coupling portion 3 of the second straight line portion 2, in addition to the coupling portion 3. That is, in the present embodiment, the coupling portion (corner portion) 3 and the region 2a adjacent to the coupling portion 3 of the second straight line portion 2 are formed to have such a thickness thinner than a thickness of the region 1a adjacent to the coupling portion 3 of the first straight line portion 1. In the present embodiment, these regions having a thinner film thickness become the low film-thickness region 4. It is desirable that the region 2a adjacent to the coupling portion 3 of the second straight line portion 2 is within a range of the distance same as a width R of the second straight line portion 2, if measured from a boundary between the coupling portion 3 and the second straight line portion 2.

Although a film thickness of the low film-thickness region 4 may be constant, the film thickness can be varied according to portions. In FIG. 2B, when a film thickness of the first straight line portion 1 excepting the low film-thickness region 4 is defined as a standard film thickness, a film thickness of the low film-thickness region 4 continuously varies within a range of 0.7 to 1.0 times the standard film thickness. More precisely, a film thickness of the low film-thickness region 4 becomes a level of 0.7 times the standard film thickness at the left edge of the coupling portion 3 in FIG. 2B and becomes such a thickness equal to the standard film thickness at the right edge of the region 2a in FIG. 2B. In FIG. 2C, a film thickness of the coupling portion 3 becomes a level of 0.8 times the standard film thickness, and a film thickness of the region 2a becomes a level of 0.9 times the standard film thickness.

The low film-thickness region 4 of the sealing material can be also formed, for example, into regions 6 and 7 as in FIG. 2D by using a Laser Ablation method after forming the glass frit on the frame member 12. From a viewpoint of simplifying the process, it is preferable that the low film-thickness region 4 of the sealing material 13 is formed by varying the distribution of mesh density of a screen mask at a time of the printing formation.

The coupling portion 3 represents not only an intersection portion, where the straight line portions of the sealing material intersect with each other, but also a region, where the irradiation histories of the local heating light scanning to the different directions are given two or more times. At least two scanning operations, i.e., Nth scanning and (N+i)th scanning, are performed to the coupling portion 3 of the sealing material illustrated in each of FIGS. 2A to 2C. Here, N is a natural number to be selected from 1 to M−1, M is the number of the sides of the sealing material, i.e., the number of the straight line portions, which is a natural number of 3 or more, and i is a natural number to be selected within a range of 1 to M−1. Although the laser beam scanning can be performed by using the single laser head, it can be also performed by using the adjacently arranged double laser heads. In the latter case, two times of the irradiation are applied to the respective straight line portions in tandem. Therefore, the irradiation is applied to the coupling portion 3 at least two times, and it could be that the irradiation is applied to the coupling portion 3 three times or more in some cases.

As just described, the low film-thickness region 4 is arranged on the coupling portion 3, to which the irradiation is applied at least two times by the scanning of the local heating light facing to the different directions, or arranged on the region 2a, to which the irradiation is not applied by the laser beam which scans in first, in a region adjacent to the coupling portion 3, in addition to the coupling portion 3. By providing such a region as the low film-thickness region 4, the reliability improvement in airtightness of the coupling portion 3 can be expected. Especially, in a case that the low film-thickness region 4 is also provided on the region 2a, the further reliability improvement in airtightness of the coupling portion 3 can be expected.

Figure 5A:
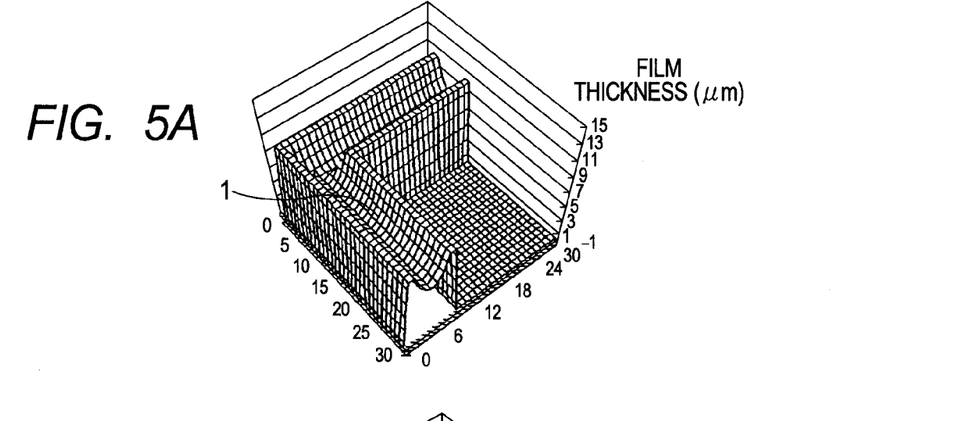
FIGS. 5A, 5B and 5C are partial perspective views illustrating a sealing material of the coupling portion for describing a problem in the present invention.
Figure 5B:
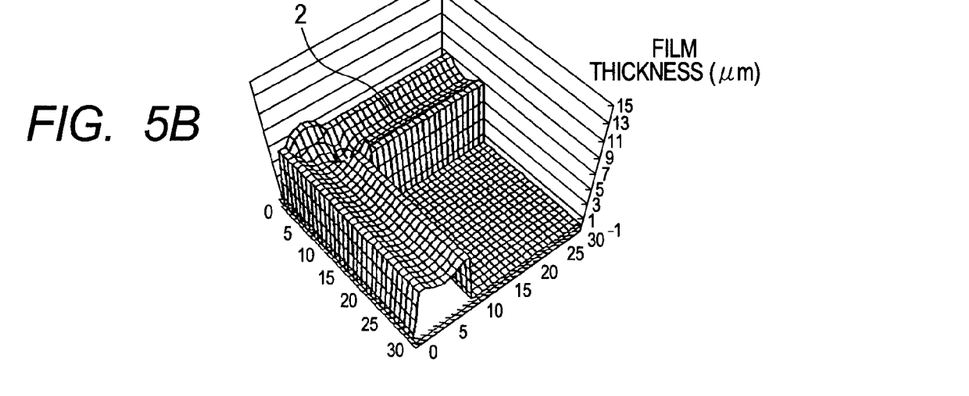
Figure 5C:
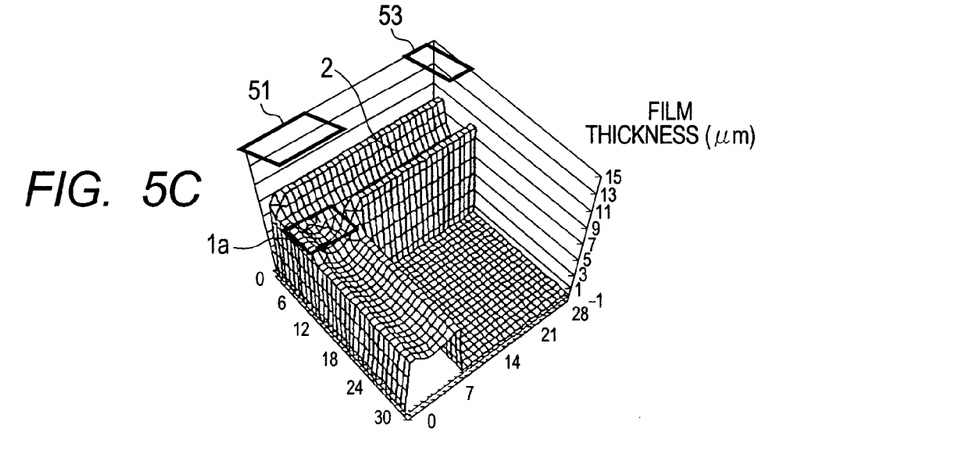

A problem in a case that the low film-thickness region is not provided will be described with reference to FIGS. 5A to 5C. Since viscosity of the sealing material has a negative temperature coefficient, fluidity at a time of applying the heat and restrictiveness at a time of cooling down can be utilized. Since the sealing material having such the property forms a preferable junction interface depending on the fluidity at a time of applying the heat and this preferable condition can be fixed at a time of cooling down, this sealing material can be preferably applied as the sealing material of a hermetic container. As for a film thickness of the sealing material which is sandwiched between glass substrates and is assembled, the sealing material is routed through the following process before and after the elementary step of sealing. A film thickness of the sealing material, which is heated and reached a melting/softening step, is decreased by the fluidity and a pressure applied from a pair of glass substrates. Thereafter, the sealing material is cooled down and fixed with a state that the thickness was decreased. The film thickness distributions of the coupling portion when the local heating light is scanned to the sealing material routed through the relevant elementary step are indicated in FIGS. 5A and 5C. FIG. 5A indicates a state of such the step, where a laser beam is not irradiated. Next, when the local heating light is irradiated to the sealing material (first straight line portion 1) which is indicated on a front side in FIG. 5A, since a film thickness of the sealing material is decreased at only the irradiated region, a state in FIG. 5C is obtained. Next, when the local heating light is irradiated to the sealing material (second straight line portion 2) which is indicated on a deep side in FIG. 5C, ideally, it is expected that a uniform sealing portion with a state that a film thickness of the sealing material is comparatively uniformly distributed can be obtained as indicated in FIG. 5B. However, as a result of the investigation conducted by the present inventor, it was understood that an ideal state as indicated in FIG. 5B is not always realized in some cases.

More specifically, a defective junction occurred in the region 1a in FIG. 5C, that is, the region 1a adjacent to the coupling portion 3 of the first straight line portion 1 irradiated first. The present inventor found that the defective junction occurred by the following reason. Namely, when a laser beam is irradiated along the first straight line portion 1, the sealing material (second straight line portion 2), which is at a step that a laser beam is not yet irradiated, positioned on a deep side in FIG. 5C has a larger film thickness because the laser beam is not yet irradiated. Therefore, when the laser beam which is to be irradiated along the first straight line portion 1 reaches the region 1a in the vicinity of the coupling portion 3, a region 51 of the second straight line portion 2 becomes to serve as a pillar and supports the glass substrate (rear plate 11) and blocks an elastic deformation facing toward the sealing material of the glass substrate. For this reason, a gap is generated between the sealing material 13 and the glass substrate (rear plate 11) in the region 1a. The defective junction slightly occurred also in a region 53 of the sealing material (second straight line portion 2), which is at a step that a laser beam is not yet irradiated, to be irradiated later.

Figure 6A:
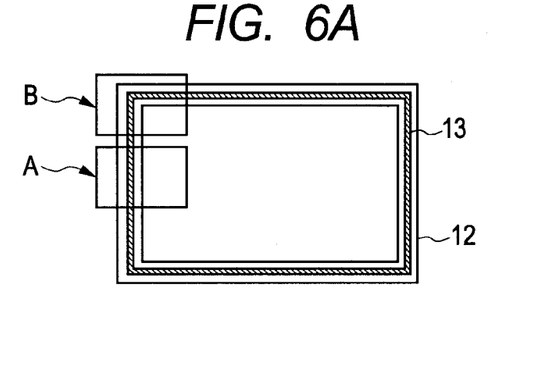
FIGS. 6A, 6B, 6C, 6D and 6E are cross sectional views and plan views illustrating the hermetic container for describing a problem in the present invention.

Phenomena described in the above embodiments will be further described with reference to FIGS. 6A to 6E. As illustrated in FIG. 6A, the sealing material 13 is provided along the frame member 12 in a frame-like shape. The sealing material 13 has such a shape which is almost a rectangle formed from straight line portions and coupling portions (corner portions). The sealing material 13 seals the frame member 12 with the rear plate 11.

Figure 6B:
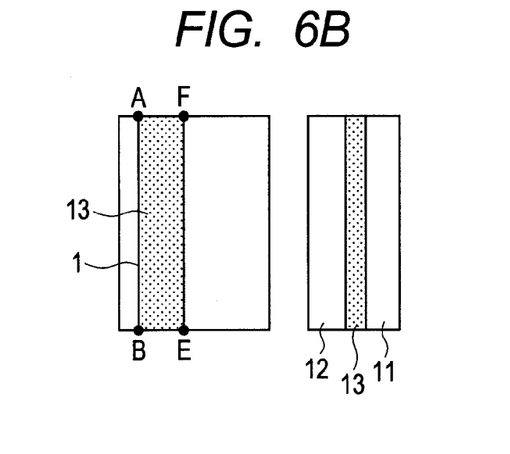
Figure 6C:
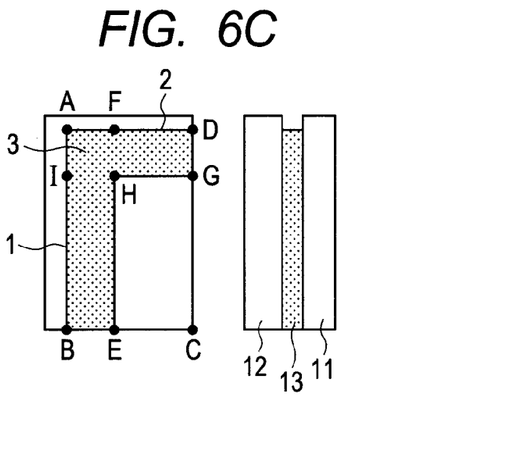
Figure 6D:
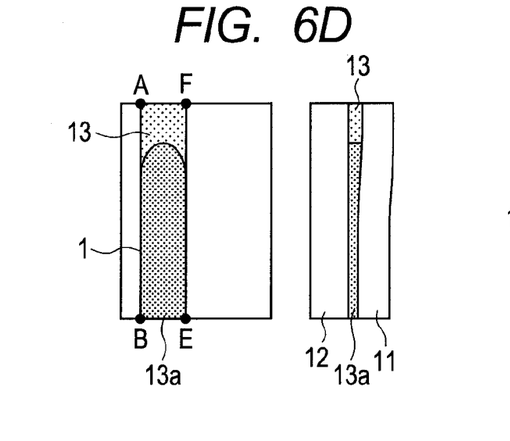
Figure 6E:
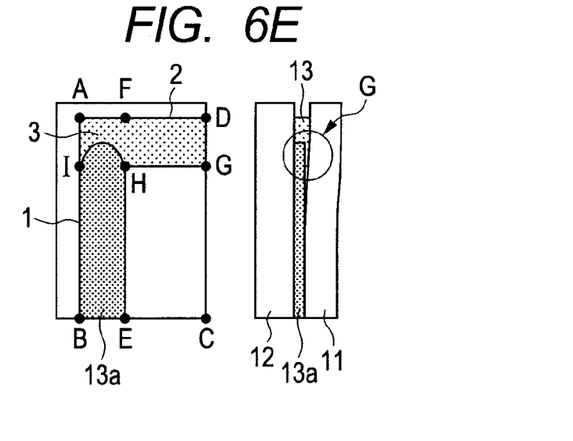

FIGS. 6B and 6C are respectively a plan view and a cross sectional view illustrating the condition of a straight line portion (portion A in FIG. 6A), which is at a step that a laser beam is not yet irradiated, and a plan view and a cross sectional view illustrating the condition of a vicinity of the coupling portion (portion B in FIG. 6A), which is at a step that a laser beam is not yet irradiated. In this step, the sealing material 13 formed on the frame member 12 and the rear plate 11 which is the material to be sealed are closely contacted with each other at any portion of the straight line portions and the coupling portions. FIGS. 6D and 6E, which indicate a process of executing the irradiation while scanning the local heating light to only sides occupied by a region ABEF of the sealing material 13, are views similar to FIGS. 6B and 6C. Although the local heating light is irradiated to the coupling portion 3 ultimately, FIG. 6E indicates a state of irradiating a laser beam to the vicinity of the boundary between the coupling portion 3 and the first straight line portion 1. As illustrated in FIG. 6D, in the first straight line portion 1, an alteration of the film thickness occurs between the sealing material 13 to which the laser beam is not irradiated and the sealing material 13a to which the laser beam is irradiated. However, since the rear plate 11 deforms following the film thickness distributions of the sealing materials 13 and 13a which continuously change and a spacing distance between the rear plate 11 and the frame member 12 decreases following the decrease of film thickness of the sealing material, adherence is ensured.

On the other hand, when referring to FIG. 6E, an alteration of the film thickness occurs between the sealing material 13, to which the laser beam is not irradiated, and the sealing material 13a, to which the laser beam is irradiated, at the vicinity of the coupling portion 3. However, at the vicinity of the coupling portion 3, at least a region surrounded by a rectangular shape FDGH maintains a high film thickness in the sealing material 13 which is at a step that a laser beam is not yet irradiated. This region becomes to serve as a kind of pillar and blocks the elastic deformation facing toward the sealing material 13a of the rear plate 11. As a result, a gap G is easily to be generated between the sealing material 13 and the glass substrate (rear plate 11), and the adherence between the sealing material 13 and the rear plate 11 is deteriorated and the defective junction occurs.

In the present embodiment, as illustrated in FIG. 2A, since the low film-thickness region 4 is formed on the coupling portion 3 of the sealing material 13, the elastic deformation facing toward the sealing material 13 of the rear plate 11 in the coupling portion 3 becomes hard to be blocked. As a result, in the region 1a adjacent to the coupling portion 3, the gap becomes hard to be generated between the sealing material 13 and the glass substrate (rear plate 11). Therefore, the defective junction becomes less likely to occur, and a hermetic container excellent in reliability can be manufactured. In addition, as illustrated in FIGS. 2B to 2D, not only a thickness of the coupling portion 3 but also a film thickness of the region 2a adjacent to the coupling portion 3 of the second straight line portion 2 can be decreased. According to this structure, a restriction effect of the sealing material as "pillar" is attenuated, and the defective junction becomes further less likely to occur.

Figure 1B:
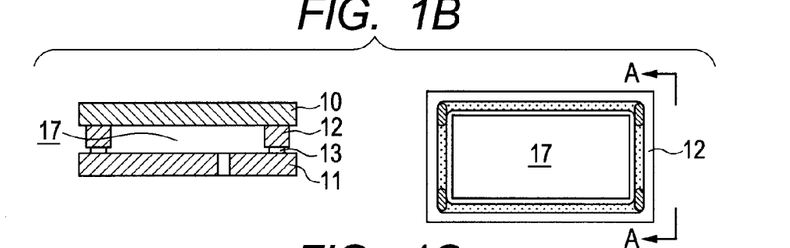

Subsequently, the rear plate 11 which has matrix wirings formed from the X-directional wirings 728 and the Y-directional wirings 729 and the electron-emitting devices 727 connected with intersection portions of the matrix wirings is prepared. Then, as illustrated in FIG. 1B, the frame member 12 integrated with the face plate 10, which has the sealing material 13 formed on its edge face, is arranged to face the rear plate 11 to define an internal space 17. By this step, an exhaust hole is provided at any of the face plate 10, the rear plate 11 and the frame member 12, and it is desirable that the internal space 17 is set to become negative pressure through the exhaust hole when assembling the rear plate 11 and the face plate 10.

A timing of integrating the face plate 10 with the frame member 12 is not limited to the above case. If it is possible to integrate, any order is available. The frame member 12 may be sealed with the face plate 10 after a sealing process of the rear plate 11 and the frame member 12 or at the same time of sealing the rear plate 11 with the frame member 12.

In order to secure a sufficient gap between the face plate 10 and the rear plate 11 to evacuate an internal space in the next process, it is preferable to arrange the spacer 708 illustrated in FIG. 7 as the spacing distance defining member in this process.

(Step 2)

Figure 1C:
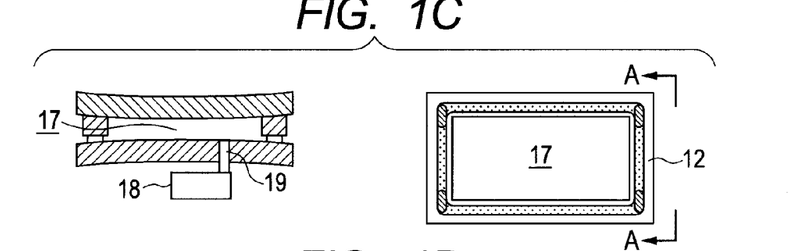

Next, as illustrated in FIG. 1C, an exhaust pipe 19 and an optional evacuating apparatus 18 are connected with an assembly structure obtained by assembling the face plate 10, the rear plate 11 and the frame member 12, and the internal space 17 is evacuated. By setting the internal space 17 to become negative pressure, the face plate 10 and the rear plate 11 are pressed by the outer atmospheric pressure to each other, and the compressive force is applied to the sealing material 13. Due to this compressive pressure, the adherence covering a whole circumference between the sealing material 13 and the glass substrate (rear plate 11) can be improved when the local heating light is irradiated, which is to be described later.

In addition, it is preferable that the coupling portion 3, of which film thickness is decreased to become a thin film, is locally pressurized by a local pressurizing mean which is not illustrated, for example, a mechanical pressurizing tool. The adherence between the sealing material 13 and the glass substrate (rear plate 11) can be further improved by pressurizing and holding the first and second glass substrates to each other at the coupling portion 3.

(Step 3: Scanning and Sealing Process)

Subsequently, the first straight line portion 1 of the sealing material 13 and the coupling portion 3 are scanned while irradiating the local heating light to them at least one time, thereafter the second straight line portion 2 of the sealing material 13 and the coupling portion 3 are scanned while irradiating the local heating light to them at least one time.

Figure 1D:
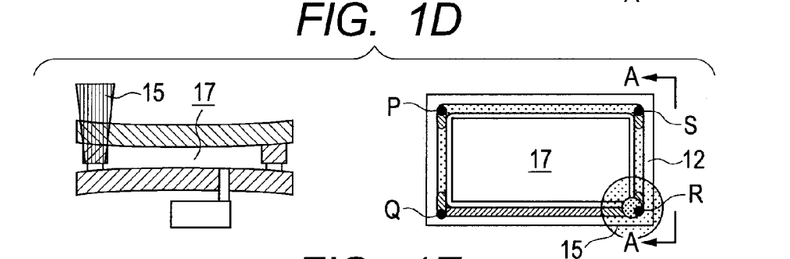
Figure 1E:
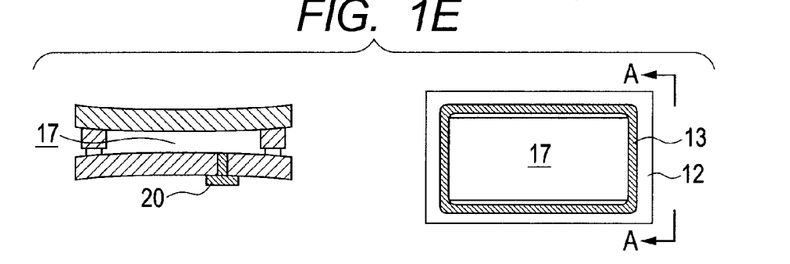
Figure 3A:
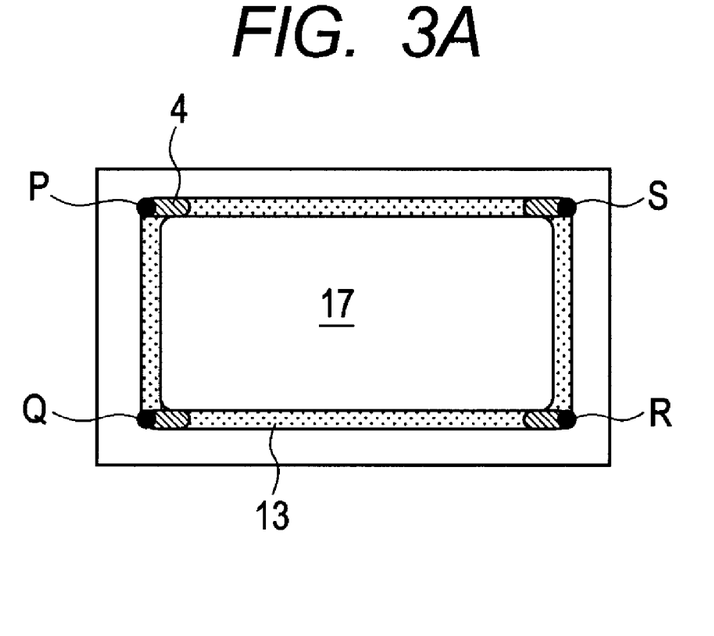
FIGS. 3A and 3B are plan views indicating a relation between the film thickness distributions of the sealing material in the vicinity of the coupling portions and scanning order of local heating light.
Figure 3B:
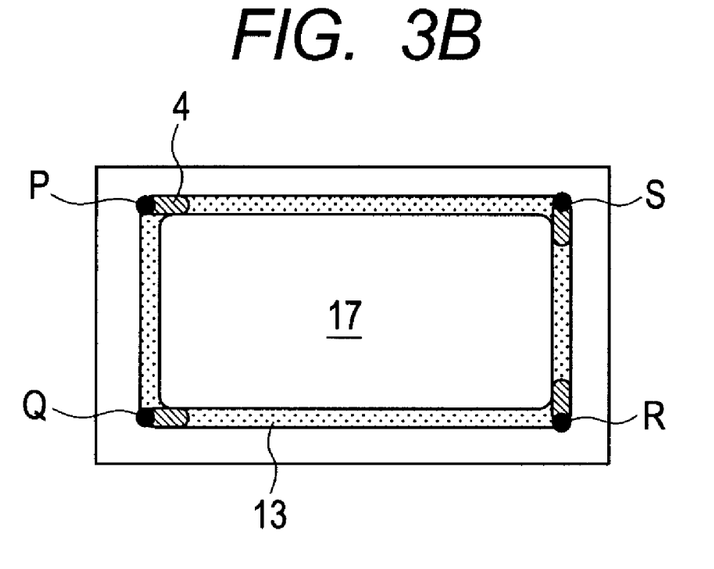

A process in the step 3 will be described below by giving specific examples with reference to FIG. 1D and FIGS. 3A and 3B. In the step 3, a scanning and sealing process of a side QR and a side SP is performed and then a scanning and sealing process of a side RS and a side PQ is performed as indicated in FIG. 1D. A fact that the low film-thickness region 4 is formed on a region adjacent to the coupling portion 3 of the side RS and the side PQ is the reason why the scanning and sealing process of the side QR and the side SP is performed first. At the step of terminating to scan the four sides of the circumferential sealing material 13, the respective coupling portions 3 are irradiated two times by the local heating light which scans to directions different from each other and reaches the step indicated in FIG. 1E.

In a case that the low film-thickness region 4 is arranged as illustrated in FIG. 1D, any of the side QR and the side SP may be scanned in first, and also, any of the side RS and the side PQ may be scanned in first. The scanning direction for each of the sides is not also limited. For example, in case of the side QR, it may be scanned from Q to R, or may be scanned from R to Q.

The scanning order can be determined in accordance with the arrangement of the low film-thickness region. In a case that the low film-thickness region is arranged as illustrated in FIG. 3A, the respective sides can be scanned in the order of PQ, SR, PS and RQ. In a case that the low film-thickness region is arranged as illustrated in FIG. 3B, the respective sides can be scanned in the order of PQ, RQ, PS and SR. In a case of FIG. 3A, the scanning order of the side PQ and the side SR can be changed, and the scanning order of the side QR and the side PS also can be changed. In a case of FIG. 3B, the scanning order of the side PQ and the side QR can be changed or the scanning can be also simultaneously performed. In a case that the low film-thickness region is not provided at the region 2a adjacent to the second straight line portion 2, since there is not a before and after relation among the sides to be scanned, each of the sides can be scanned in the arbitrary order. In this manner, as described above, the respective sides are sealed and a manufacturing of a hermetic container is completed.

The embodiment of the present invention further includes, instead of the process of arranging the low film-thickness region in the part of the circumferential sealing material as described above, a process of making the region easily deformable in the heating and sealing by increasing the bulk, not the film thickness, of the sealing material in the region to which the low film-thickness region should be provided. That is, the present invention includes to have the effect same as that in case of the low film-thickness, by providing the region in which the film density of the sealing material has been lowered.

As a method of lowering the film density of the part of the sealing material, a method of distributing and putting fine grains of low-boiling organic substances into the glass frit, a method of replacing a partial layer with a low-density glass frit layer by laminating the sealing materials, or the like can be used.

Hereinafter, the present invention will be described in detail with concrete examples.

EXAMPLE 1

By applying the above-described embodiments, an integrated matter of a frame member and a face plate is airtightly sealed with a rear plate, further, after the pressurization is released, an internal space is again evacuated from an exhaust hole and the exhaust hole is sealed by a cover member, thereby manufacturing a vacuum hermetic container which can be applied to an FED (Field Emission Display).

(Step 1)

First, a face plate 10 is formed. More specifically, a high strain point glass substrate having a thickness of 1.8 mm (PD200: made by Asahi Glass Co., Ltd.) is formed into a plate glass having an external shape of 980 mm×570 mm×1.8 mm by performing a cutting work to prepare it as a plate glass shaped face plate 10 having that external shape. Subsequently, a surface of the face plate 10 is degreased by an organic solvent cleaning, a pure water rinsing and a UV-ozone cleaning. Then, by forming phosphor, a black matrix, and an anode (not illustrated) as a pattern on the face plate, an image forming region is formed on one surface of the face plate 10. Subsequently, a non-evaporable getter made of metal Ti is formed on the anode by a sputtering method. Then, a sealing material (not illustrated) made of a glass frit is formed in the outside of the image forming region by a screen printing method and an atmosphere heating process. In this manner, the face plate, on which the sealing material is formed, is prepared.

Subsequently, a frame member 12 is formed. More specifically, a high strain point glass substrate having a thickness of 1.5 mm and an external shape of 960 mm×550 mm×1.5 mm (PD200: made by Asahi Glass Co., Ltd.) is prepared. Then, a region of 950 mm×540 mm×1.5 mm of a center region is cut out by the cutting work, thereby forming the frame member 12 of which a cross sectional surface is almost rectangle having a width of 5 mm and a height of 1.5 mm. Then, a surface of the frame member 12 is degreased by the organic solvent cleaning, the pure water rinsing and the UV-ozone cleaning in a manner similar to a case of the face plate.

Subsequently, the frame member 12 comes into contact with a surface, on which a phosphor pattern of the face plate 10 is formed, and is temporarily assembled by using a pressurizing tool (not shown) and then the assembly is airtightly sealed in an atmospheric firing furnace, thereby preparing the face plate 10 integrated with the frame member.

Subsequently, a sealing material 13 is formed on the frame member 12. In this example, a glass frit is used as the sealing material 13. The used glass frit is such a paste characterized in that a Bi system lead-free glass frit (BAS115: made by Asahi Glass Co., Ltd.) having a thermal expansion coefficient of $\alpha = 79 \times 10^{-7} /° C.$, a glass transition point of 357° C. and a softening point of 420° C. is treated as a base material and organic substances are dispersed and mixed as a binder. Then, the sealing material 13 having a width of 1 mm and a thickness of 7 µm is formed along the circumferential length on the frame member 12 by using a screen printing method. In this case, in order to form a region having thin film thickness in a low film-thickness region 4, a screen mask, of which the mesh density in a part corresponding to the low film-thickness region 4 is 1.3 times higher than that in a part corresponding to a straight line portion, is used. Thereafter, the sealing material 13 is dried at 120° C. together with the face plate 10 integrated with the frame member 12. Then, in order to burn out the organic substances, it is heated and baked at 460° C., and the sealing material 13 is formed. In this manner, an assembly composed of the sealing material 13, the frame member 12 and the face plate 10 is prepared. A film thickness of the sealing material 13 after the baking is equal to 8 µm in the low film-thickness region 4 and equal to 10 µm in a region other than the low film-thickness region 4.

Subsequently, as the rear plate 11, a high strain point glass substrate having an external shape of 990 mm×580 mm×1.8 mm (PD200: made by Asahi Glass Co., Ltd.) is prepared. Then, an exhaust hole having a diameter of 2 mm is formed in a region out of an image forming region of the rear plate 11 by the cutting work. Subsequently, after the rear plate 11 was cleaned in a manner similar to cases of the face plate 10 and the frame member 12, the electron-emitting devices and the matrix wirings for driving are formed. The non-evaporable getters made of a metal Ti are formed on the matrix wirings for driving by a sputtering method.

Then, an integrated matter of the frame member 12 and the face plate 10 is aligned with the rear plate 11 sandwiching the sealing material 13 between them by oppositely facing surfaces, on which phosphor patterns and electron-emitting devices are respectively formed, each other. In this case, the frame member 12 comes into contact with the rear plate 11 as illustrated in FIG. 1B, and the assembly, of which an internal space 17 is defined, is formed.

(Step 2)

Subsequently, an evacuating apparatus 18 composed of a scroll pump and a turbo-molecular pump is connected with an exhaust hole through an exhaust pipe 19 as illustrated in FIG. 1C, and the internal space 17 is evacuated until reaching a degree of vacuum equal to $1\times10^4$ Pa. Then, the coupling portions 3 of the sealing material 13 are selectively irradiated by a laser beam 15, and the frame member 12 and the rear plate 11 are locally sealed with each other while maintaining the degree of vacuum of the internal space 17, thereby forming four local restriction regions as illustrated in FIG. 1D.

(Step 3)

Subsequently, the laser beam 15 is irradiated to the sealing material 13 while maintaining the negative pressure condition of an internal space of the assembly, and the rear plate 11 and the frame member 12 are airtightly sealed with each other. More specifically, as illustrated in FIG. 1D, four sides are scanned in the order of Q→R, S→P, R→S and P→Q, and two times of the irradiation are performed to the four coupling portions 3 per one time of the scanning.

For the purpose of the scanning of the laser beam 15, two semiconductor laser apparatuses (not illustrated) for the manufacturing are prepared, and they are arranged such that irradiation spots of two laser beam sources (first and second laser beam sources) are aligned on the one straight line. From the first and second laser beam sources, the laser beams both having a wavelength of 980 nm, a laser power of 212 W and an effective diameter of 2 mm are irradiated. The first and second laser beam sources scanned at a speed of 1000 mm/s. The second laser beam source performs the scanning 0.05 seconds later after the first laser beam source performed the scanning. That is, a position of an irradiation spot of the second laser beam source is set to locate 50 mm behind from a position of an irradiation spot of the first laser beam source, and this spacing distance is maintained while the scanning is performed.

Subsequently, the evacuating apparatus 18 and the exhaust pipe 19 are removed from the exhaust hole, and the gas in the internal space 17 is once vented to reach the atmospheric pressure. According to this process, the pressurization to the sealing material is released. Thereafter, the whole container is heated in a cart type heating furnace having a cover member sealing mechanism in the heating furnace while evacuating the internal space 17 from the exhaust hole, and the inside of a container is evacuated by the non-evaporable getter, thereby completing a container as a vacuum hermetic container by sealing a cover member 20 as illustrated in FIG. 4E.

The hermetic container is manufactured in this manner, and then an FED (Field Emission Display) apparatus is completed by mounting a driving circuit and the like in accordance with an ordinary method. When the completed FED apparatus is made to be operated, it was confirmed that the stable electron emission and image display for a long time can be performed and the stable airtightness at a level capable of applying to the FED apparatus is ensured.

EXAMPLE 2

Figure 4A:
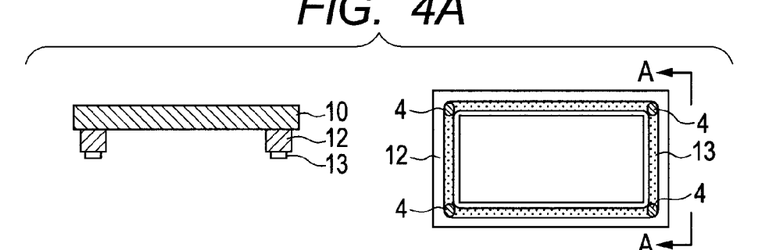
FIGS. 4A, 4B, 4C, 4D and 4E are cross sectional views and plan views illustrating another example of the hermetic container manufacturing method according to the present invention.
Figure 4B:
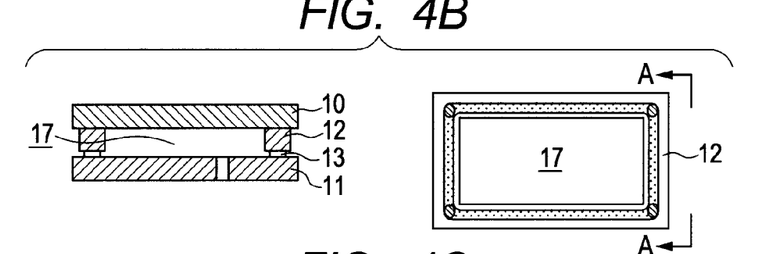
Figure 4C:
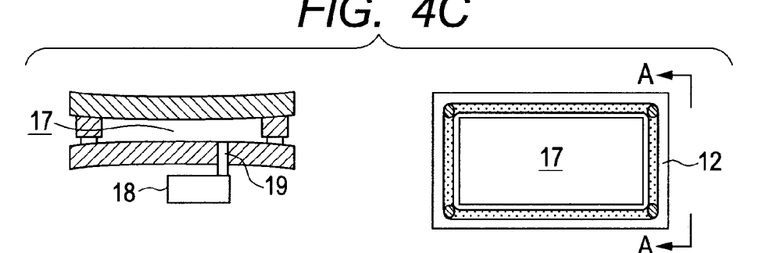
Figure 4D:
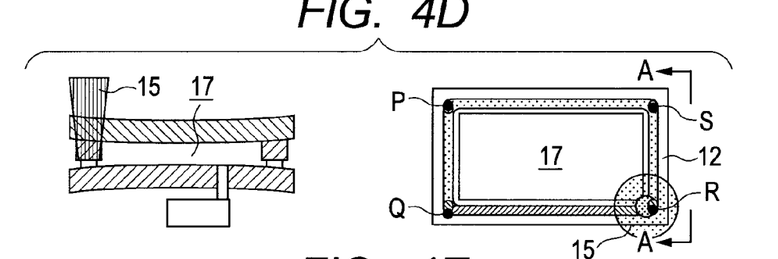
Figure 4E:
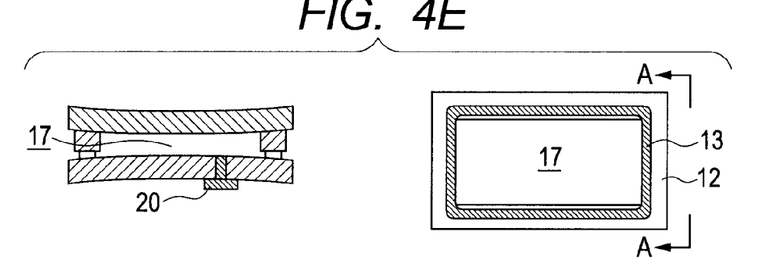

In this example, as indicated in FIGS. 4A to 4E, the low film-thickness region 4 is formed on only the coupling portion 3 instead of the low film-thickness region 4 in the example 1 as illustrated in FIG. 4A. Excepting this point, the hermetic container which can be applied to the FED apparatus is manufactured based on the conditions similar to those of the example 1. The film thickness of the sealing material 13 is set to become 8.0 μm at the general portion and 7.0 μm at coupling portions. The film thickness of the sealing material after completing the hermetic container was 6.4 μm.

When the completed FED apparatus is made to be operated, it was confirmed that the stable electron emission and image display for a long time can be performed and the stable airtightness at a level capable of applying to the FED apparatus is ensured.

While the present invention has been described with reference to the exemplary embodiment, it is to be understood that the invention is not limited to the disclosed embodiment. The scope of the following claims is to be accorded the broadest interpretation so as to encompass all such modifications and equivalent structures and functions.

This application claims the benefit of Japanese Patent Application No. 2010-075066, filed Mar. 29, 2010, which is hereby incorporated by reference herein in its entirety.

What is claimed is:

1. A manufacturing method of a hermetic container, which includes a step of sealing a first glass substrate and a second glass substrate forming at least a part of the hermetic container together with the first glass substrate to each other, the manufacturing method comprising:

an assembling step of arranging, between the first glass substrate and the second glass substrate, a sealing material which includes a first straight line portion and a second straight line portion respectively stretching in different directions and a coupling portion connecting the first straight line portion and the second straight line portion to each other, and with the sealing material having a viscosity with a negative temperature coefficient; and a scanning sealing step of performing scanning to the first straight line portion and the coupling portion of the sealing material while irradiating local heating light at least once, and performing scanning to the second straight line portion and the coupling portion of the sealing material while irradiating the local heating light at least once, wherein the assembling step includes a step of forming at least a part of the sealing material at the coupling portion with a film thickness thinner than that of the sealing material in a region adjacent to the coupling portion of the first straight line portion.

2. The manufacturing method according to claim 1, wherein the sealing material includes a glass frit.

3. The manufacturing method according to claim 1, wherein
the first glass substrate includes a plate glass substrate, and the second glass substrate includes a frame glass substrate, and
the assembling step includes a step of providing the sealing material with a state of circling along the second glass substrate.

4. The manufacturing method according to claim 3, wherein the hermetic container includes a container of a field emission display.

5. The manufacturing method according to claim 3, wherein the hermetic container is made by vacuum insulated glazing glass.

6. The manufacturing method according to claim 1, wherein the assembling step includes a step of making the coupling portion and a region adjacent to the coupling portion of the second straight line portion thinner than the region adjacent to the coupling portion of the first straight line portion.

7. The manufacturing method according to claim 1, wherein a region adjacent to the coupling portion of the second straight line portion is within a range of a distance the same as a width of the second straight line portion, if measured from a boundary between the coupling portion and the second straight line portion.

8. The manufacturing method according to claim 1, wherein the assembling step includes a step of locally pressurizing and holding the first glass substrate and the second glass substrate at the coupling portion.

9. A manufacturing method of a hermetic container, which includes a step of sealing a first glass substrate and a second glass substrate forming at least a part of the hermetic container together with the first glass substrate to each other, the manufacturing method comprising:
- an assembling step of arranging, between the first glass substrate and the second glass substrate, a sealing material which includes a first straight line portion and a second straight line portion respectively stretching in different directions and a coupling portion connecting the first straight line portion and the second straight line portion to each other, and with the sealing material having a viscosity with a negative temperature coefficient; and
- a scanning sealing step of performing scanning to the first straight line portion and the coupling portion of the sealing material while irradiating local heating light at least once, and thereafter performing scanning to the second straight line portion and the coupling portion of the sealing material while irradiating the local heating light at least once,
- wherein the assembling step includes a step of forming at least a part of the sealing material at the coupling portion with a density lower than that of the sealing material in a region adjacent to the coupling portion of the first straight line portion.

\* \* \* \* \*